United States Patent [19]

Tilley et al.

[11] 4,048,391
[45] Sept. 13, 1977

[54] ALKALI METAL-SULPHUR CELLS

[75] Inventors: Alec R. Tilley, Blackbrook, near Belper; Michael D. Hames, Spondon, both of England

[73] Assignee: Chloride Silent Power Limited, London, England

[21] Appl. No.: 679,626

[22] Filed: Apr. 23, 1976

[30] Foreign Application Priority Data

Apr. 24, 1975 United Kingdom ............... 17088/75

[51] Int. Cl.² ............................................. H01M 4/36
[52] U.S. Cl. .................................... 429/104; 429/191
[58] Field of Search .................. 429/104, 102, 101, 30, 429/31, 33, 191, 193

[56] References Cited

U.S. PATENT DOCUMENTS

| | | |
|---|---|---|
| 3,748,178 | 7/1973 | Fally et al. ............................ 429/104 |
| 3,841,912 | 10/1974 | Kagawa et al. ....................... 429/104 |
| 3,883,367 | 5/1975 | Chiku .................................... 429/104 |
| 3,915,741 | 10/1975 | Kogiso et al. ..................... 429/102 X |
| 3,932,195 | 1/1976 | Evans et al. ........................... 429/104 |
| 3,933,523 | 1/1976 | Dubin et al. .......................... 429/191 |
| 3,939,007 | 2/1976 | Sudworth et al. ................... 429/193 |

*Primary Examiner*—C. F. LeFevour
*Attorney, Agent, or Firm*—Pollock, Vande Sande & Priddy

[57] ABSTRACT

An alkali metal sulphur cell has an outer tubular casing and an inner tubular solid electrolyte whose interior constitutes the cathode compartment of the cell. The outer tubular casing and the tubular solid electrolyte are spaced apart to define an annular space, at least the part of which adjacent the outer surface of the tubular solid electrolyte constitutes the anode compartment of the cell. Means are provided for causing the alkali metal to be distributed over the outer surface of the tubular solid electrolyte. Barrier means additional to the solid electrolyte are disposed between the sulphur material and at least a part of the outer casing. The barrier means may comprise a coating on one or both surfaces of the tubular solid electrolyte, alkali metal flow restrictor means or a coating on at least a part of the inner surface of the outer casing.

12 Claims, 1 Drawing Figure

U.S. Patent          Sept. 13, 1977          4,048,391
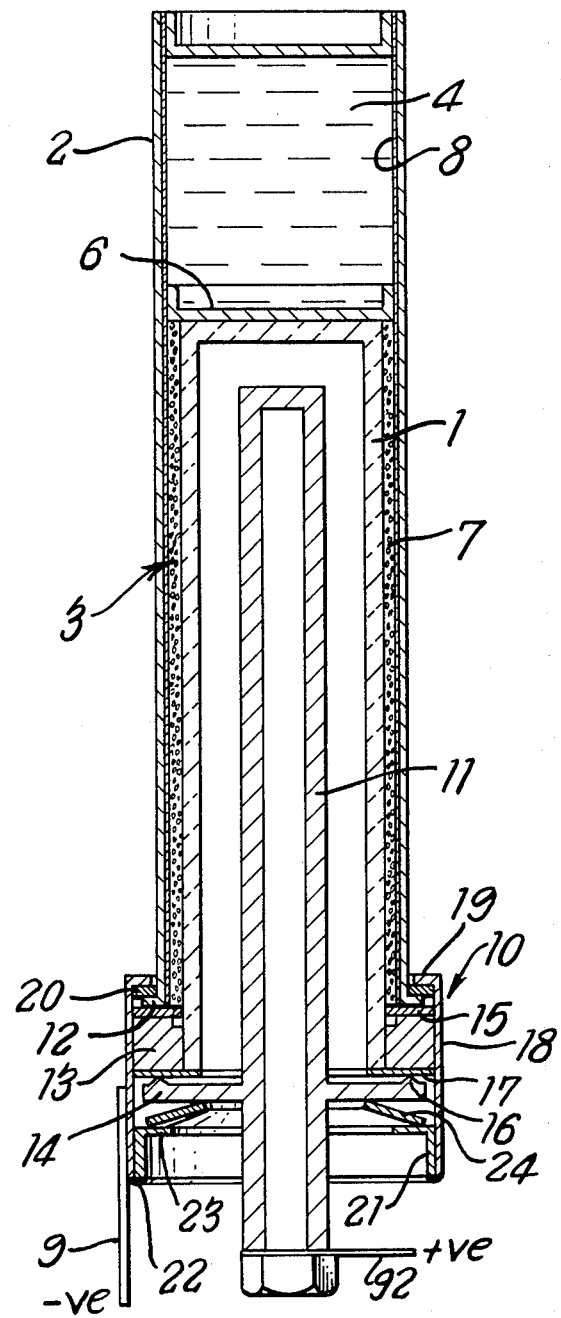

ALKALI METAL-SULPHUR CELLS

This invention relates to alkali metal-sulphur cells, in which the electrochemical reactants are liquid alkali metal, e.g., sodium, as negative active material (anode) and liquid sulphur material as positive active material (cathode) and anode and cathode compartments are separated by a solid electrolyte which is a sodium ion conductor, such as beta-alumina.

The object of the present invention is to provide a cell design in which the hazards which can arise in the event of cell failure are minimized.

One major cause of cell failure is the breakdown of the solid electrolyte so that liquid alkali metal and sulphur come into direct contact with each other. In certain circumstances this could result in an exothermic reaction raising the temperature of the cell above its normal operating temperature.

According to the present invention an alkali-metal sulphur cell comprises an outer tubular casing, an inner tubular solid electrolyte whose interior constitutes the cathode compartment of the cell and which is spaced from the outer casing to define an annular space, at least the part of which adjacent the outer surface of said solid electrolyte constitutes the anode compartment of the cell, means for causing the alkali-metal to be distributed over the outer surface of said solid electrolyte, an alkali-metal reservoir defined at least in part by the casing, and at least one barrier means additional to the solid electrolyte and disposed between the sulphur material and at least part of the outer casing.

Thus one form of said barrier means may comprise a coating on the outer surface of the solid electrolyte. The coating will tend to hold the solid electrolyte together in the event of fracture of the solid electrolyte so that holes cannot readily form in the solid electrolyte permitting direct contact between the cell reactants. Said coating may comprise a porous coating, for example plasma sprayed onto the surface of the solid electrolyte. The coating itself may be reinforced by fibres or mesh within it.

Recent studies have shown that such coatings have another advantage in that they perform a wicking action and therefore simultaneously constitute said means for distributing the alkali-metal over the outer surface of the solid electrolyte. It is not clear at this time whether this wicking action arises mainly from the capillary action of the pores in the metal coating or from the capillary action of a small gap formed at the interface between the solid electrolyte and the coating produced by the differential thermal expansion of the solid electrolyte and the coating when the cell is brought to its operating temperature. Aluminum, nickel and copper have proved successful as coatings.

Reinforcement may alternatively, or additionally be provided on the inner surface of the solid electrolyte, i.e., in the cathode compartment and comprise a porous coating of a ceramic material possibly reinforced with ceramic fibres, for example a porous coating of alpha alumina reinforced with alumina fibres within it. Thus the ceramic fibres may be positioned on the surface of the solid electrolyte and the ceramic coating plasma sprayed on to it.

In a second form said barrier means may comprise a flow restrictor for alkali-metal whereby to control the amount of alkali metal available in the anode compartment for reaction to the minimum necessary for optimum cell operation and for this purpose the anode compartment can be suitably dimensioned so that it will just contain this minimum amount of alkali, replenishment of the sodium as the cell discharges being from the sodium reservoir.

In one embodiment this flow restriction may comprise an inert or reactive filler material in the anode compartment to reduce the space in the anode compartment available for alkali metal. Suitable filler materials are glass beads, steel shot, ceramic spheres or powder, silicon carbide granules, graphite powder or spheres.

In a second embodiment the flow restrictor may comprise a member between the alkali metal reservoir and the anode compartment and formed from a material which is not corrodible by the cell reactants, e.g., it is non-metallic. The restrictor may comprise a porous mass, for example in the form of a porous body or a mesh. Alternatively it could be in the form of a capillary tube or a thermally operated valve preset to operate at say 450° C.

The restrictor in accordance with this second embodiment may comprise:

1. carbon felts treated so that they are wetted by alkali-metal, for example coated with titanium carbide or metalized
2. ceramic cloths and felts
3. sintered ceramic bodies
4. ceramic, carbon and glass beads.

In a third form particularly when said outer casing is of metal, said barrier means may comprise a covering on the inner surface of said casing of a material which is not readily corroded by sodium polysulphides. It is not necessary for this covering to be electronically conducting for normal cell operation, since the column of alkali metal in the anode compartment can itself be used as the conductor leading to a current collecting pole at one or other end of the alkali metal column. Hence electronically conducting and non-electronically conducting coverings may be used. Examples of such coverings are:

1. carbon sleeves e.g., of Grafoil material
2. ceramic (e.g., alumina), carbon and glass cloths
3. corrosion resistant metal shims, e.g., of molybdenum
4. mica or composite mica sleeves
5. glass or ceramic sleeves
6. ceramic spray coatings, e.g., of alumina or titania
7. vitreous enamel coatings
8. carburized steel coatings.

In sodium sulphur cells, glass seals are sometimes provided between the beta-alumina solid electrolyte component and an alpha-alumina component. For example a beta-alumina tube may have an alpha-alumina flange for mounting the tube in the cell. Such glass seals are susceptible to sodium penetration. Such glass seals may be provided with an alpha alumina coating to prevent sodium penetration.

Said means for distributing the alkali-metal over the outer surface of the solid electrolyte may comprise an annular shim spaced from the surface of the solid electrolyte to provide a capillary gap. In this case the anode compartment will comprise the space between the outer surface of the electrolyte and the shim. The space between the shim and the outer casing may then comprise the alkali-metal reservoir. Alternatively or additionally said means may comprise a differential pressure arrangement, whereby the sodium is forced under pressure along the anode compartment.

In order that the invention may be readily understood, one construction of sodium-sulphur cell embodying several of the features set out above will now be described by way of example with reference to the accompanying drawing, which shows a sectional elevation of the cell construction.

Referring to the drawing, the cell comprises an inner tube 1 of beta-alumina which is closed at its upper end and which constitutes the solid electrolyte of the cell and an outer stainless steel tube 2 which is also closed at its upper end and constitutes the cell case. The interior of the tube 1 defines the cathode compartment of the cell and therefore in the charged condition of the cell contains sulphur. The annular space 3 between the tubes 1 and 2 defines the anode compartment of the cell and therefore in the charged condition of the cell contains sodium. The outer tube 2 extends above the inner tube 1 to define a sodium reservoir 4 which is separated from the annular space 3 by a restrictor 6 in the form of a porous sintered ceramic body. To restrict the amount of sodium available for reaction within the sodium compartment the annular space 3 is made as narrow as possible and is further reduced in volume by filling it with glass beads 7, which also serve as a restrictor for the flow of sodium from the reservoir 4.

The outer surface of the beta-alumina tube 1 is coated in the manner described above, but such coating has not been shown in the drawing. Also the inner surface of the tube 2 is provided with a protective sleeve or coating 8 as described above, over its whole length.

One current collecting pole of the cell comprises the stainless steel tube 2 which may be coated on its outside with, for example, aluminum to improve its conductivity. The case 2 is electrically connected to a cell terminal 9 through a sealing and clamping arrangement 10 to be described. The other current collecting pole of the cell comprises a carbon tube 11 which extends within the beta-alumina tube 1 and carries the other cell terminal 92 at its end outside the tube 1. To improve the conductivity of the tubular pole 11, it may be coated on its inner surface, for example by spraying, with a highly conducting metal.

The sealing and clamping arrangement 10 seals off the lower open ends of the tubes 1 and 2. For this purpose the tubes 1, 2 and 11 are provided with flanges 12, 13 and 14 respectively. The flange 13, which may be of alpha-alumina and secured to the tube 1 by a glass seal, spray coated with alpha-alumina, abuts the flange 12 through an aluminum gasket 15 to close off the annular space 3. The flange 14 has a rib 16 which abuts the flange 13 through a Grafoil gasket 17. The flanges are clamped together under compression by a sleeve assembly comprising an outer sleeve 18 which at its upper end has an inturned flange 19 abutting the rear side of flange 12 through an insulating gasket 20 and an inner sleeve 21 which is welded to the sleeve 18 at 22 and has an inturned flange 23 which urges a resilient disc 24 against the flange 14.

Several of the cell design features described above are also applicable to cells in which the interior of the tubular solid electrolyte constitutes the anode compartment and the annular space between the tubular solid electrolyte and the outer tubular casing constitutes the cathode compartment, as will be readily appreciated by those skilled in the art.

We claim:

1. An alkali metal-sulphur cell comprising an outer tubular casing, an inner tubular solid electrolyte whose interior constitutes the cathode compartment of the cell containing sulphur material, said inner tubular solid electrolyte being spaced from said outer tubular casing to define an annular space therebetween, at least the part of said annular space adjacent to the outer surface of said inner tubular solid electrolyte constituting the anode compartment of the cell and containing alkali metal, an alkali metal reservoir from which alkali metal is supplied to said anode compartment, and means located between said outer tubular casing and said inner tubular solid electrolyte and surrounding the outer surface of said inner tubular solid electrolyte for limiting material upon mechanical failure of said solid electrolyte.

2. An alkali metal-sulphur cell according to claim 1 wherein said means comprises a coating on the outer surface of said inner tubular solid electrolyte for holding the solid electrolyte together in the event of fracture of the solid electrolyte.

3. An alkali metal-sulphur cell according to claim 1 wherein said means comprises a filler material in said anode compartment operative to reduce the space in the anode compartment available for alkali metal, said filler material being a material which is inert to alkali metal and alkali-metal polysulphides at high temperature.

4. An alkali metal-sulphur cell according to claim 1 wherein an alkali-metal flow restrictor is provided between said reservoir and the anode compartment, said flow restriction being formed from a nonmetallic material selected from carbon felt treated so that it is wetted by alkali metal, ceramic cloth or felt, a sintered ceramic body, ceramic, carbon or glass beads.

5. An alkali metal-sulphur cell according to claim 1 wherein said means comprises a covering on the inner surface of said outer tubular casing, said covering being fabricated of a material which is not readily corrodible by sodium polysulphide.

6. An alkali metal-sulphur cell according to claim 2 wherein said coating is a metallic material selected from the group of aluminum, nickel and copper.

7. An alkali metal-sulphur cell according to claim 2 wherein the coating is a sprayed-on coating.

8. An alkali metal-sulphur cell according to claim 2 wherein said coating is nonmetallic.

9. An alkali metal-sulphur cell according to claim 8 wherein said coating comprises a ceramic material.

10. An alkali metal-sulphur cell according to claim 3 wherein the filler material is selected from glass beads, steel shot, ceramic spheres, ceramic powder, silica carbide granules, graphite powder, and graphite spheres.

11. An alkali metal-sulphur cell according to claim 5 wherein said covering comprises a sleeve disposed adjacent said inner surface of said casing.

12. An alkali metal-sulphur cell according to claim 5 wherein said covering is selected from
    a. a carbon sleeve
    b. a ceramic, carbon or glass cloth
    c. a corrosion resistant metal shim
    d. a mica sleeve
    e. a glass or ceramic sleeve
    f. a ceramic spray coating
    g. a vitreous enamel coating, and
    h. a carburized steel coating.

* * * * *